(12) United States Patent
Lorch

(10) Patent No.: US 7,726,337 B2
(45) Date of Patent: Jun. 1, 2010

(54) SHUT-OFF AND REVERSING VALVE

(75) Inventor: Werner Lorch, Schramberg (DE)

(73) Assignee: Hansgrohe AG, Schiltach (DE)

( * ) Notice: Subject to any disclaimer, the term of this patent is extended or adjusted under 35 U.S.C. 154(b) by 493 days.

(21) Appl. No.: 11/569,367

(22) PCT Filed: Sep. 23, 2005

(86) PCT No.: PCT/EP2005/010298

§ 371 (c)(1),
(2), (4) Date: Jan. 12, 2007

(87) PCT Pub. No.: WO2006/034821

PCT Pub. Date: Apr. 6, 2006

(65) Prior Publication Data

US 2007/0267079 A1    Nov. 22, 2007

(30) Foreign Application Priority Data

Sep. 29, 2004  (DE) .................. 10 2004 048 035

(51) Int. Cl.
*F16K 11/074* (2006.01)
*F16K 11/22* (2006.01)

(52) U.S. Cl. .................. 137/625.11; 137/614.21; 137/636.2

(58) Field of Classification Search ........... 137/614.21, 137/625, 625.11, 625.13, 625.15, 636.2, 137/637.2, 637.3, 597
See application file for complete search history.

(56) References Cited

U.S. PATENT DOCUMENTS

| | | | | |
|---|---|---|---|---|
| 2,093,692 A | * | 9/1937 | Daniels | 137/614.21 |
| 2,391,126 A | | 12/1945 | Carter | |
| 2,609,207 A | * | 9/1952 | Van Sickle | 137/636.1 |
| 2,700,984 A | * | 2/1955 | Gleasman | 137/625.11 |
| 2,940,473 A | * | 6/1960 | Smith | 137/883 |
| 2,979,082 A | * | 4/1961 | Neves | 137/625.11 |
| 3,520,327 A | * | 7/1970 | Abbott et al. | 137/625.11 |
| 3,665,952 A | * | 5/1972 | Chronister | 137/625.11 |
| 4,178,963 A | * | 12/1979 | Riefler et al. | 137/625.11 |
| 4,538,640 A | * | 9/1985 | Acker | 137/625.11 |
| 6,131,611 A | * | 10/2000 | Knapp | 137/614.17 |
| 6,257,279 B1 | * | 7/2001 | Peltz | 137/637.3 |
| 6,357,476 B1 | | 3/2002 | Moretti | |
| 6,655,410 B2 | * | 12/2003 | Nember | 137/625.11 |

FOREIGN PATENT DOCUMENTS

| | | |
|---|---|---|
| DE | 41 39 815 A1 | 6/1993 |
| DE | 203 16 356 U1 | 1/2004 |
| DE | 196 41 545 B4 | 11/2004 |

OTHER PUBLICATIONS

German Search Report; May 27, 2005.
English Translation of International Preliminary Report on Patentability; Apr. 24, 2007.

* cited by examiner

*Primary Examiner*—John Rivell
(74) *Attorney, Agent, or Firm*—Duane Morris LLP

(57) ABSTRACT

A disk-type valve encompasses both throughput control and a distribution function for distributing water through the valve to one of several outlets. A movable control disk for throughput control is actuated independently of a movable control disk for output selection. Both separately actuated controls cooperate with a joint stationary distribution disk and pressure forcing the movable control disks against the distribution disk can be adjusted and regulated separately. Two actuating elements are disposed around one another as a shaft and sleeve, for actuating the control disks independently.

10 Claims, 3 Drawing Sheets

SHUT-OFF AND REVERSING VALVE

Figure 1:
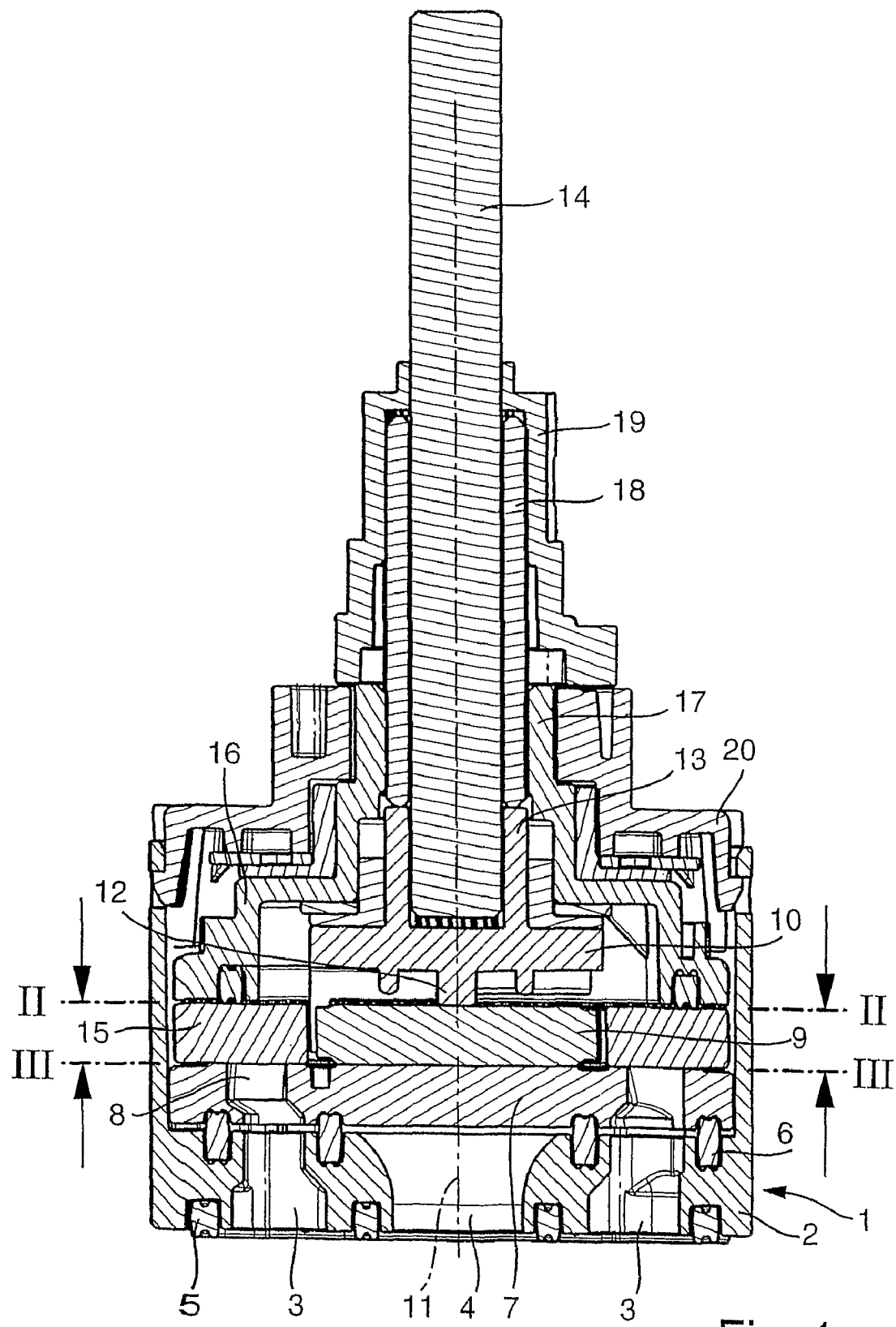

The invention refers to a valve in which shut-off possibilities and distribution of water to one of several distributing outlets are combined. Such valves are familiar. Generally, they have one single actuating element with which both output as well as the selection of the water outlet can be actuated from the valve. Since most sanitary valves are made as ceramic disk valves, the problem evolves that the ceramic disks become larger with increasing number of distributing outlets. Therefore, the forces required to actuate the valve increase due to greater friction. This applies especially when the shut-off and the distribution activities are united in the same pair of control disks in order to reduce the total height of the valve.

A valve with which both the shut-off as well as the distribution to several outlets can be carried out is already familiar (U.S. Pat. No. 6,357,476). Independence is thereby not provided, since the pivoted control disk of the one control interacts with the likewise pivoted control disk of the other control.

The invention is based on the task to provide a shut-off and distribution valve that is easy to operate with a simple and space-saving design.

To solve this task, the invention proposes a valve with the features mentioned in claim 1. Further embodiments of the invention are subject matter of subordinate claims.

The invention proposes the use of a disk control both for output control as well as for the selection of the water outlet from the valve. Both disk controls each have a movable control disk, wherein, according to the proposal of the invention, these two control disks can be actuated independent of one another. In this manner the actuating force is reduced since the user only needs to actuate the distribution control when he wishes to supply water to another water outlet. To switch on and off, meaning output control, he only needs to actuate one of the two control disks.

Since the disk control for the selection of the water outlet is located downstream from the output control, in the pressureless section, minor requirements are present for this disk control in regard to sealing. It is therefore possible, as the invention proposes in a further embodiment, that the moveable control disks of both controls can be pressed independent of one another. In this manner, the control disk of the output control allows pressing with a sufficient force for the required sealing, without having to consider the ease of operation during construction. On the other hand, during disk control for the selection of water outlet, the ease of operation can be taken into consideration without putting special emphasis on sealing.

In order to keep the design objective of minimum total height in focus, it can be provided in a further embodiment of the invention that the two movable control disks are located at least approximately in the same plane.

According to the invention it can be provided that the control disk of the output control is centrally positioned whilst the control disk of the selection control is positioned outside the central control disk. This also contributes to keeping the actuating forces low, since, by turning the central control disk, shorter distances must be covered.

In particular, it can be provided that the control disk of the selection control is made as a ring.

Through the measures taken in the invention, it is possible that both controls can feature a common fixed control disk. This is also proposed in the invention.

For actuation via the output control, in a further embodiment according to the invention, a pivoted shaft can be provided in an axis which runs through the middle of the control disk.

For actuating the switch-over control, a sleeve enclosing the central shaft can be provided.

In yet a further embodiment of the invention, it can be provided that the adjustment range of the switch-over control may be limited by at least a limit stop. When a valve is provided for a possibly larger number of water outlets but only a small number of water outlets is present, it can thus be avoided in this manner that the switch-over element can be placed in to positions corresponding to the missing water outlets.

In yet a further embodiment of the invention, it can be provided that the positions of the switch-over control allocated to the water outlets are designed in grid form. The two end positions of the shut-offs are likewise designed in grid form to prevent them from being inadvertently shifted during actuation of the outer disk.

It is particularly reasonable if the surfaces of the stationary control disk that correspond to the movable control disks lie in one plane. An embodiment is also possible in which the stationary control disk features a step.

Figure 2:
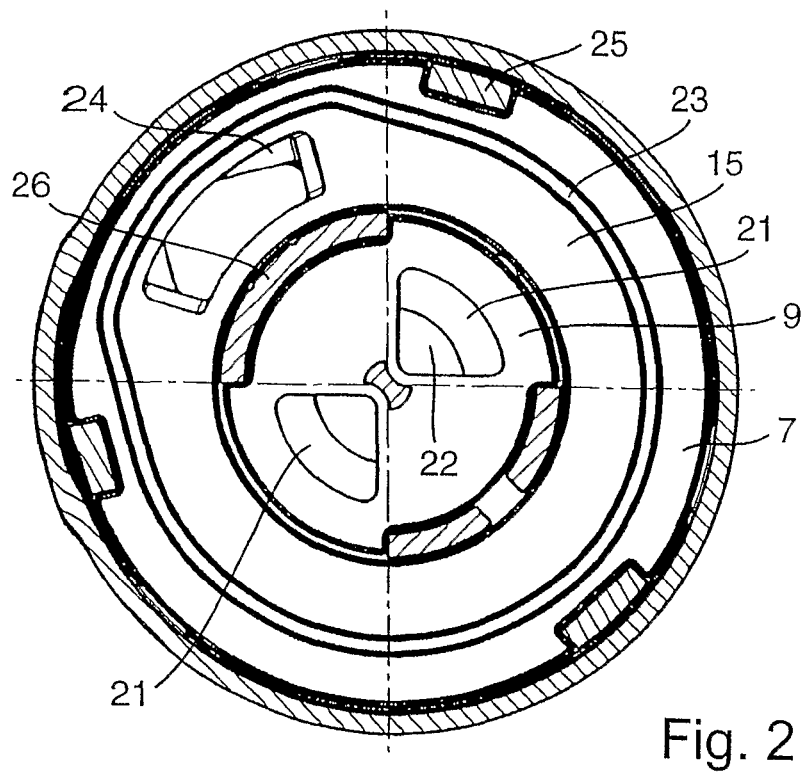
Figure 3:
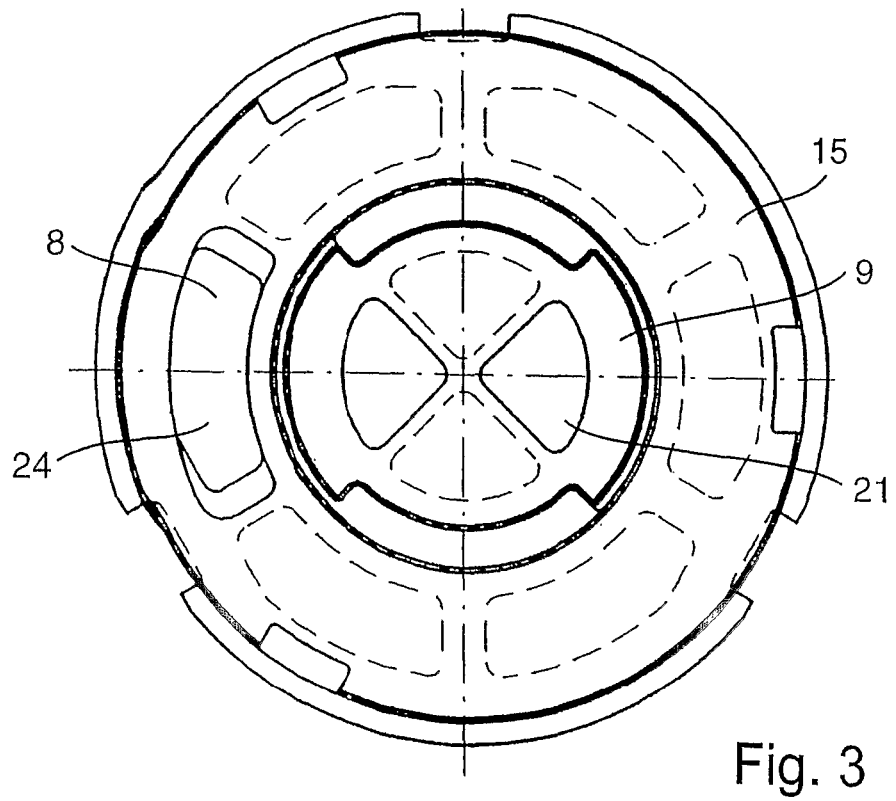
Figure 4:
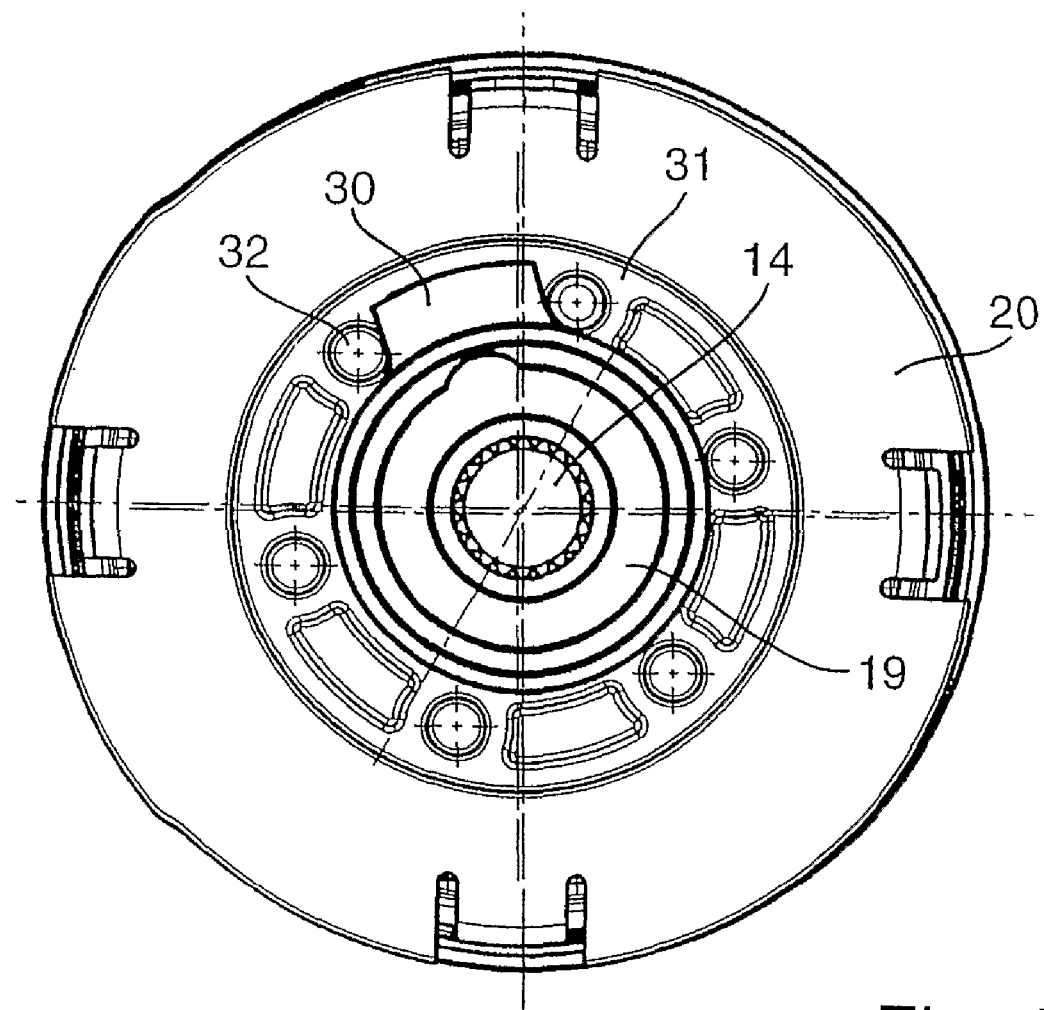

Further features, details, and preferences of the invention result from the claims and the abstract. The wording of the two are based on the content of the description, on the following description of a preferred embodiment of the invention, and on the drawing. The following are shown:

FIG. 1 axial section through a valve according to the invention;

FIG. 2 section through the valve along the line II-II in FIG. 1;

FIG. 3 section along the line III-III in FIG. 1;

FIG. 4 plan view of the valve from top in FIG. 1.

The sanitary valve depicted in FIG. 1 in the axial section contains a valve housing 1 that is closed by means of a base 2 in its bottom section. The base 2 contains a plurality of outlet openings 3 as well as an inlet opening 4 in the middle. The valve housing 1 is inserted into a fitting housing in which the corresponding channels are provided. For sealing against the fitting housing, a seal 5 is provided.

On the base 2 of the valve housing 1, a stationary ceramic disk 7 is provided above the seals 6, which is also generally called a distribution disk. This distribution disk 7 has passage openings 8 that are in connection with water outlets 3. The distribution disk 7 features also two middle cut-outs, which are in connection with the water inlet 4. These middle cut-outs are not visible in the section of FIG. 1.

Above the distribution disk 7, a first movable control disk 9 is centrally located. This movable control disk 9 can be rotated with the help of a holding bracket 10 around the dash-hinted axis 11. The holding bracket 10 meshes with a middle extension 12 in an opening of the pivoted control disk 9 not visible in the section of FIG. 1. On its top side, the holding bracket 10 features a sleeve-type extension 13 in which an actuating shaft 14 meshes from the top side. This actuating shaft 14 protrudes out of the valve housing 1 and serves for fixing a rotating knob or a rotating lever.

Outside the pivoted control disk 9, a second movable control disk 15 lies on the control surface of the distribution disk 7, which is formed as a ring and surrounds the central control disk 9. The movable control disk 15, formed as a ring, can be rotated with the help of a second holding bracket 16, which is splined with an upper extension 17 and a sleeve 18. This sleeve 18 is supported on the actuating shaft 14. On the upper end of the sleeve 18, an external rotating sleeve 19 is attached with splines, which is accessible from the outside, and therefore creates the possibility of rotating the second, movable control disk 15 via the sleeve 18 and the holding bracket 16. An actuating element is attached on the outer rotating sleeve 19.

With the help of the actuating shaft 14, the inner movable control disk 9 may be rotated. With the help of the outer rotating sleeve 19, the second movable control disk 15 may be rotated. Both actuations are independent of one another.

A valve housing cover 20 serves as support relative to the valve housing 1, which is snapped into the top end of the valve housing 1. In the top openings of this valve housing cover 20, first the extension 17 of the holding bracket 16 and within this extension the sleeve 18 is supported.

Through this, the actuating shaft 14 is also supported relative to the valve housing 1.

Now to FIG. 2. FIG. 2 shows a cross-section through the arrangement of FIG. 1 along the line II-II. Hereby, the two movable control disks 9 are visible in the plan view. The inner, rotatable control disk 9 features two passage openings 21, which each feature the form of a circular sector. Through the passage openings 21, the central opening 22 of the distribution disk 7 is visible. Based on the position of the pivoted control disk 9, water can more or less flow into the space above the control disk 9.

Outside the central movable control disk 9, the control disk 15, formed as a ring, is depicted, wherein the form of the seal 23 is hinted. This control disk 15, formed as a ring, features a passage opening 24, through which the water above the central control disk 9 can again flow through the cut-out 24 downwards and into one of the possible water outlets 3. For rotation of the outer control disk 15, three extensions are provided, which mesh into the corresponding recesses in the edge section of the control disk 15.

For rotating the central control disk 9, extensions 26 are likewise provided on the respective holding bracket 10 and on the corresponding extensions in the circumference of the control disk 9.

FIG. 3 shows a section along the line II-II in FIG. 1. Here, the form of the bottom side of the outer control disk 15 and the inner control disk 9 are visible. In the depicted position, the cut-outs 21 of the control disk 9 are displaced relative to the water inlet openings, so that no water flows through. The cut-out 24 in the outer control disk 15 lies in the extension of an opening 8 of the distribution disk 7.

One can derive that from FIGS. 2 and 3, by rotating the outer control disk 15, it can be determined which of the water outlets is supplied with water. Intermediate positions are also possible with which two neighbouring water outlets can be supplied with water. With the help of the inner control disk 9, the quantity of water flowing through can be adjusted.

FIG. 4 shows a plan view of the arrangement of FIG. 1. Here it can be seen that the outer rotating sleeve 19 is formed as a protrusion that is rotated by rotating the sleeve 19. In the top side 31 of the valve housing cover 20, several blind holes 32 are provided, in which a pin can be stuck. This allows the swivel range of the rotating sleeve 19 to be limited. This should provide the possibility of limiting the swivel range, when only two or three of the possible six water outlets depicted are connected.

Through separate actuation of both control disks 9 and 15, it is possible to only require a small actuating force, since for example, when shutting a water outlet, only the inner control disk 9 needs to be rotated. On the other hand, in this manner it is possible to separately set up and adjust the pressing force of the outer control disk 15 on the distribution disk 7 by means of the pressing force of the central control disk 9.

What is claimed is:

1. Combined shut-off and distribution valve, comprising:
    a water inlet leading into the valve, an output control for the water inlet, wherein the output control is formed as a disk control,
    at least one water outlet from the valve,
    a selection control for selecting at least one said water outlet, wherein the selection control is formed as a disk control, which is located downstream of the output control,
    wherein the movable control disks are located at least approximately in a same plane, and,
    wherein movable control disks of both the output control and the selection control can be actuated independent of one another.

2. The valve according to claim 1, wherein the movable control disks of both the output and selection controls are arranged to be pressed independent of one another.

3. The valve according to claim 1, wherein the control disk of the output control is centrally located and the control disk of the selection control is located around the control disk of the output control.

4. The valve according to claim 1, wherein the control disk of the selection control is formed as a ring.

5. Combined shut-off and distribution valve, comprising:
    a water inlet leading into the valve,
    an output control for the water inlet, wherein the output control is formed as a disk control,
    at least one water outlet from the valve,
    a selection control for selecting at least one said water outlet, wherein the selection control is formed as a disk control, which is located downstream of the output control,
    wherein movable control disks of both the output control and the selection control can be actuated independent of one another, and
    wherein both the output and the selection controls use as a control disk a common stationary distribution disk.

6. The valve according to claim 1, further comprising a rotatable shaft with an axis running through the control disk for actuation of the output control.

7. The valve according to claim 6, further comprising a sleeve surrounding the shaft for actuating the selection control.

8. The valve according to claim 1, wherein an adjustment range of the selection control is limited by at least one limit stop.

9. The valve according to claim 1, wherein a plurality of positions corresponding to switch-over control of water outlets by the selection control are formed in grid manner.

10. The valve according to claim 5, wherein a surface of the stationary distribution disk and facing surfaces of the movable control disks lie along one plane.

* * * * *